E. G. Ward.

Slate Pencil Holder.

N° 95,859. Patented Oct. 12, 1869.

Witnesses;
H. C. Aestkerite
Wm A Morgan

Inventor;
E. G. Ward
per Munn & Co
attorneys

United States Patent Office.

EDWARD G. WARD, OF HOBOKEN, NEW JERSEY.

Letters Patent No. 95,859, dated October 12, 1869.

IMPROVEMENT IN SLATE-PENCIL HOLDERS.

The Schedule referred to in these Letters Patent and making part of the same.

*To all whom it may concern:*

Be it known that I, EDWARD G. WARD, of Hoboken, in the county of Hudson, and State of New Jersey, have invented a new and improved Pencil-Holder Attachment for Slates, and other purposes; and I do hereby declare that the following is a full, clear, and exact description thereof, which will enable others skilled in the art to make and use the same, reference being had to the accompanying drawings, forming part of this specification.

The present invention relates to a new and useful manner of preserving and protecting a slate-pencil from being lost or broken, all of which will be understood from the following, reference being had to the accompanying drawings, in which—

Figure 1:
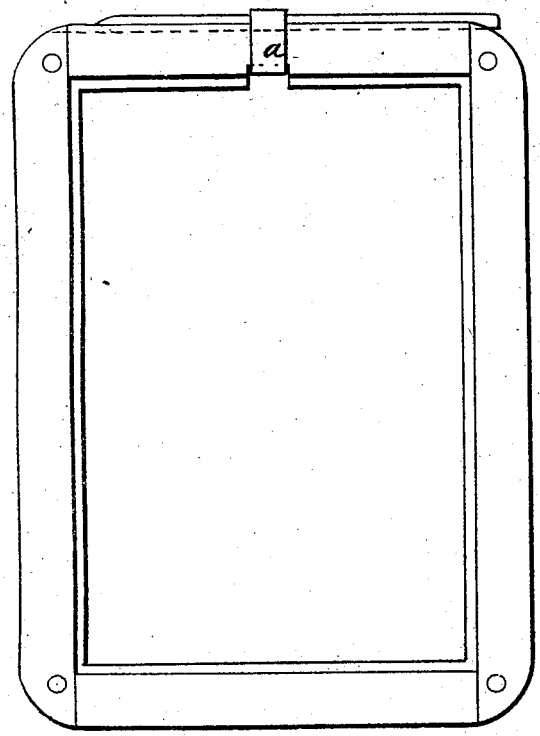

Figure 1 represents a view of a school-slate, with my slate-pencil attachment applied.

Figure 2:
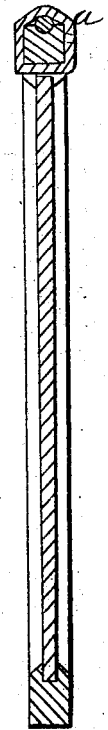

Figure 2, a section of the same.

Similar letters of reference indicate corresponding parts.

The letter $a$ represents a stout India-rubber band, set in a mortise in the frame of the slate.

The top of the slate-frame is grooved or guttered, so as to hold and protect the slate-pencil from slipping sidewise, while the India-rubber band $a$ will hold the pencil snug and firm in its place.

Having thus described my invention,

What I claim as new, and desire to secure by Letters Patent, is—

Attaching the pencil to the slate by means of the elastic band $a$, passing through a mortise in the slate-frame, and beneath which, in the groove formed in the edge of the frame, the pencil is placed, as herein shown and described.

The above specification of my invention signed by me, this 9th day of March, 1868.

EDWD. G. WARD.

Witnesses:
WM. F. MCNAMARA,
ALEX. F. ROBERTS.